United States Patent [19]

Anderson et al.

[11] Patent Number: 4,579,533

[45] Date of Patent: Apr. 1, 1986

[54] METHOD OF TEACHING A SUBJECT INCLUDING USE OF A DICTIONARY AND TRANSLATOR

[76] Inventors: Weston A. Anderson, 763 La Para Ave., Palo Alto, Calif. 94306; Gerald M. Fisher, 1491 Greenwood Ave., Palo Alto, Calif. 94301

[21] Appl. No.: 614,997

[22] Filed: Aug. 31, 1984

Related U.S. Application Data

[63] Continuation of Ser. No. 371,591, Apr. 26, 1982, abandoned, which is a continuation-in-part of Ser. No. 362,666, Mar. 29, 1982, Pat. No. 4,406,626, which is a continuation of Ser. No. 62,286, Jul. 31, 1979, abandoned.

[51] Int. Cl.⁴ .......................... G09B 5/06; G06K 9/00
[52] U.S. Cl. ..................................... 434/157; 434/169; 434/307; 434/308; 364/419; 381/52
[58] Field of Search ................ 434/156, 157, 307–321, 434/323, 335, 169, 167, 339, 338; 364/419; 381/52

[56] References Cited

U.S. PATENT DOCUMENTS

| | | | |
|---|---|---|---|
| 3,780,450 | 12/1973 | Podkopaev et al. | 434/335 |
| 3,932,859 | 1/1976 | Kyriakides et al. | 434/156 |
| 4,144,656 | 3/1979 | Podkopaev et al. | 434/157 |
| 4,278,838 | 7/1981 | Antonov | 179/15 F |
| 4,337,375 | 6/1982 | Freeman | 434/313 |

Primary Examiner—Richard C. Pinkham
Assistant Examiner—MaryAnn Stoll Lastova
Attorney, Agent, or Firm—Gerald M. Fisher

[57] ABSTRACT

A microprocessor based electronic teaching aid which enables a student viewing a display containing text material being studied to designate any word or portion of text for definition or for vocalization by synthesized speech techniques wherein the reading material being studied is supplied in the form of a programmed Source ROM which contains pointers to the start addresses for the words of the reading material with reference to an internally provided dictionary. A program causes the creation of the text display responsive to the Source ROM data, and includes techniques for being able to define and vocalize any selected word. This combination of hardware and software permits a significant reduction in the cost of this teaching aid by elimination of disk drives or tape drives.

5 Claims, 14 Drawing Figures

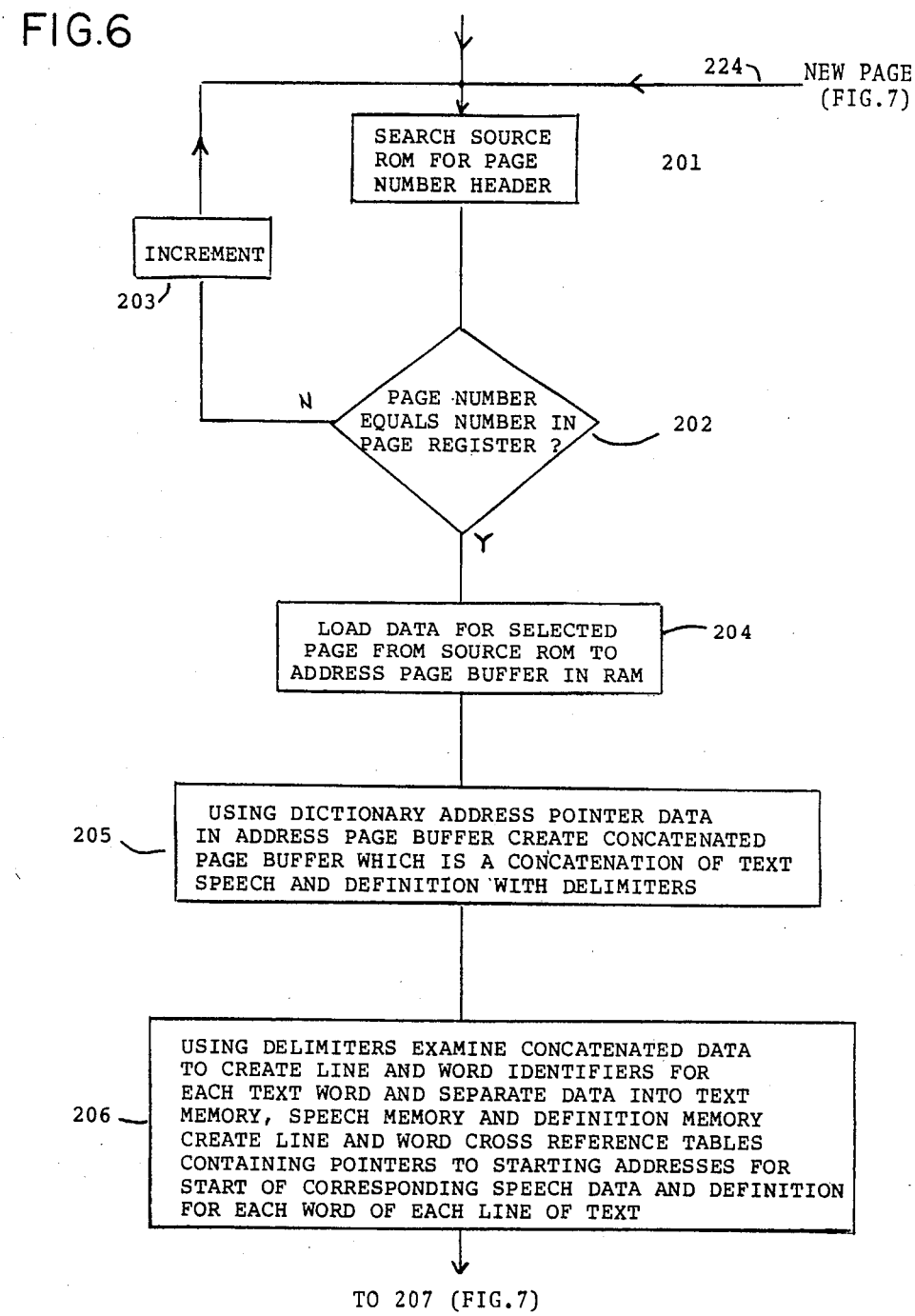

METHOD OF TEACHING A SUBJECT INCLUDING USE OF A DICTIONARY AND TRANSLATOR

This application is a continuation of application Ser. No. 371,591 filed Apr. 26, 1982, now abandoned which is a continuation-in-part of our application Ser. No. 362,666, filed Mar. 29, 1982 now U.S. Pat. No. 4,406,626, which is a continuation of application Ser. No. 62,286, filed July 31, 1979, now abandoned entitled "Electronic Teaching Aid".

TECHNICAL FIELD

This invention relates to electronic teaching aids for the teaching of reading and foreign languages.

BACKGROUND OF THE INVENTION

Electronic devices which permit a student to read quickly through a text which contains words not in the reading vocabulary of the student by interactively providing the sounding or definitions of selected words are described in our U.S. Pat. No. 4,406,626, filed July 31, 1979.

The device and method of the copending application enable improved student motivation in that the reading material used for learning to read can be selected from material which is interesting to the student even though a reasonably large percentage of the words in the text are not in the student's current reading vocabulary. This method of teaching supplements the phonics methods since so many words in the english language or in other languages do not decode audibly in a regular manner. These devices aid students in gaining a sight reading vocabulary and employ the sounding approach to the reinforcement of learning and speed up learning foreign languages by quickly providing definitions or translations in the student's native language.

SUMMARY OF THE INVENTION

This system is configured around a microprocessor and employs a different format for the storage and retrieval of the information to be displayed as compared to the eariler system referenced above by the same inventors. These changes enable the device to provide the same user benefits but permit reduction in the cost of the required hardware and reduction in the cost of the software as well. The system of this invention is configured to receive a plug-in device containing the reading material to be studied in the form of a programmed ROM (Read Only Memory). The ROM does not contain the data for the words in the reading material in concatenated from as in our earlier system but contains a pointer to the start addresses for those words with reference to an internally provided standard dictionary.

It is the primary objective of this invention to reconfigure our earlier system to substantially reduce a graphic representation of cost so that this great improvement in aid of teaching can be made available to the largest number of people.

GENERAL DESCRIPTION OF THE INVENTION

In view of the poor reliability of lower cost tape players for digital systems and the higher cost of disk drives, these items are eliminated in this inventive embodiment. The system is configured around a microprocessor which interfaces to a ROM (called Source ROM) which contains pointers to the data representative of the material to be studied and displayed. This data is called the Source data. To be able to reduce the expenses of introducing the Source data it was determined to format the Source ROM data to contain mostly pointers to the starting address for the intended words of the text as contained in a portion of memory called a Dictionary.

The above described configuration required the storage of the data for preselected words in Dictionary Memory. The Dictionary memory is in two parts, a standard and nonstandard section, each containing binary data for each preselected word in a sequential format as follows: ASCII text, delimiter, speech data, delimiter, ASCII definitions, delimiter. For these purposes, "definition" is understood to include the meaning or translation in a different language. The standard section of Dictionary memory can have any order with respect to its text words since the start addresses of the data corresponding to each word is the preferred manner in which the data is retrieved. However, it will facilitate the system if the words in the standard dictionary are arranged alphabetically.

In an 8 bit microprocessor, since typically 16 address lines are available, approximately 65,000 direct addresses are retrievable. If all this memory were useable for Dictionary purposes, since on average, using the phoneme type synthesizer, approximately 20 bytes/word is required (without definitions) a maximum of 3200 Dictionary words would be directly addressable. Using peripheral management circuits, such as an Intel 8255 Programmable Peripheral Interface, greater storage could be achieved at some additional complexity. Since significantly greater storage is required if the speech synthesizer is the LPC or digital filter type, such as 600 bits/word, a 16 or 32 bit microprocessor may be advantageously used. In Intel 8086, a 16 bit microprocessor, has 20 address lines which implies the ability to directly address 1 million words of 16 bits each. Assuming the 600 bit/word requirement, 24,000 words maximum could be addressable with the 8086.

Alternatively, by arranging the Dictionary memory so that the data for each new Dictionary word starts on a predetermined binary boundary, it is possible to expand the retrievable memory bytes above the 65,000 normally considered addressable by an 8 bit processor. For example, if the boundary is present to 16 bytes, the addressing capacity can be increased to the equivalent of a 20 bit address bus or 1.0 Mbytes for an 8 bit processor.

In the configuration of this invention, provision can be made in a non-standard dictionary to add to the contained standard dictionary a smaller number of words in order to expand the selection of materials for study. If a word is to be used in the Source which is not in the standard Dictionary memory, then all the necessary concatention of data to display the three forms of the word are placed into the Source ROM in a predetermined area called the non-standard Dictionary, and this data is appended to the standard Dictionary memory when the Source ROM is connected to the system.

The format of the data in Source also includes a special address format indicating punctuation, single ASCII characters, or control characters. For example, using an 8 bit processor, address 00xxH or FFxxH indicates that the next data is punctuation or control where the data xxH is the hexidecimal ASCII value of the data. Capital letters are provided for in the text at the beginning of a sentence by the operating program and in the middle of the line by special control characters.

This scheme permits significant reduction in the amount of data in the Source ROM required to uniquely specify textual material. A 65K bit ROM used as a Source can provide 4000 starts addresses. This is sufficient to point to approximately 40 pages of text material, assuming 100 words per page, considering punctuation and control bytes. A 256K bit ROM would provide pointers to approximately 160 pages of text. These capacities are significantly reduced if a large number of non-standard words provided in the Source ROM.

BRIEF DESCRIPTION OF THE DRAWINGS

FIG. 6 and FIG. 7 are flow diagrams for the execution program controlling the microprocessor.

DETAILED DESCRIPTION OF INVENTION

Figure 1:
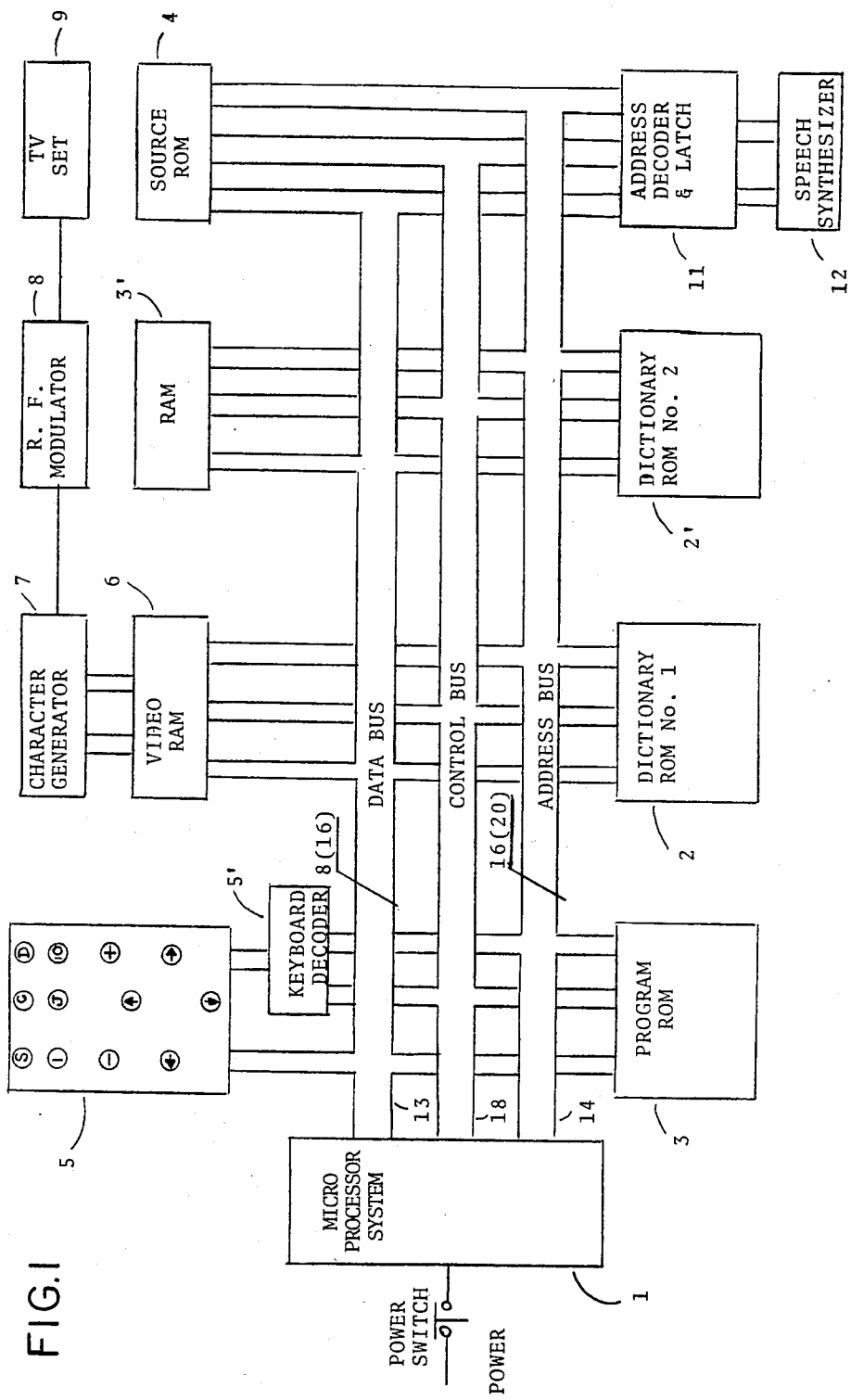
FIG. 1 is a functional block diagram of a preferred embodiment of the microprocessor based teaching aid device.

The microprocessor system depicted in FIG. 1 will implement an embodiment of the inventive teaching aid. For illustrative purposes, a microprocessor based control system 1, incorporating for example an 8 bit Z80 microprocessor chip, is shown schematically connected to memory elements 2,2',3,3',4 and 6, to output latch 11, and keypad decoder 5' and keypad 5 via address bus 14, data bus 13, and control bus 18. The microprocessor based control system includes a clocking oscillator, control line decoders, power supply, power on reset circuit, address bus output drivers, three state drivers for the data bus, etc. A review of the requirements for interfacing a microprocessor system can be found in the book entitled "Microprocessor Interfacing Techniques", by Lesea and Zaks, Sybex Inc., Berkeley, Ca. The Dictionary ROM 2, and 2' are shown separately to illustrate that additional ROM may be inserted in the system and blocks of memory. This configuration enables a flexible system permitting insertion of additional Dictionary ROM if it is desired to expand the available vocabulary. If a 16 bit processor is used, such as an INTEL 8086, the data bus would be 16 bits and the address bus would be 20 bits as is indicated in parenthesis on FIG. 1. Alternatively, additional Source ROM may be added to an 8 bit processor system using the hardware and software technique similar to that explained below with aid of FIGS. 2B and 2C with reference to the Dictionary ROM.

Figure 2A:
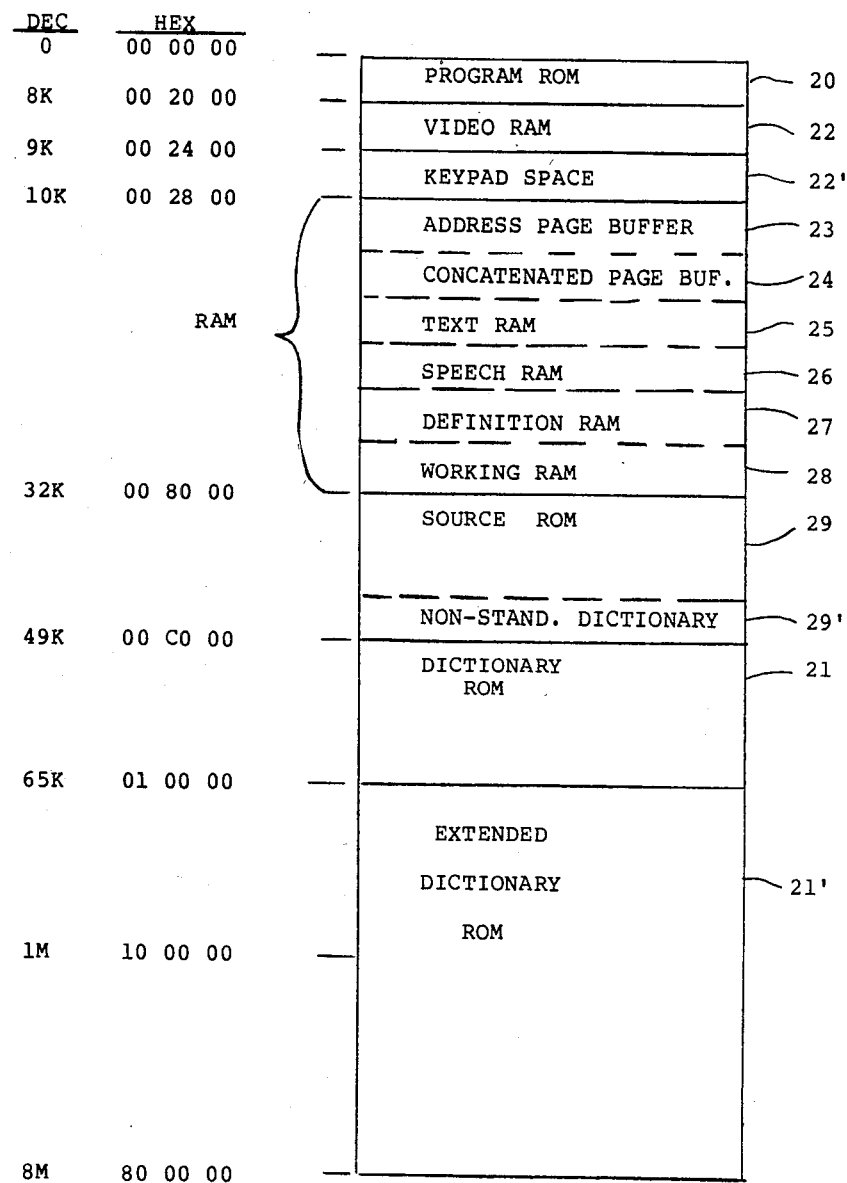
FIG. 2A is the memory map for the microprocessor of FIG. 1.

FIG. 2A depicts a preferred memory map for an 8 bit processor Teaching aid of FIG. 1. The first 8000 bytes, 20, are reserved for the execution program which is contained in Program ROM 3 FIG. 1. The following 1K byte, 22, is set aside for the video memory static RAM 6 of FIG. 1. Keypad decoder 5' of FIG. 2 requires only a few bytes of address space; however, to simplify the decoding process, 1000 bytes, 22', of memory map FIG. 2A are reserved for it. The next 18K bytes of memory map FIG. 2A are reserved for RAM, 3' of FIG. 1. The RAM memory space is allocated by the program into the Address Page Buffer 23 of 300 bytes, the Concatenated Page Buffer 24 of 2700 bytes, a text RAM 25, a speech RAM 26 and definition RAM 27 of 1024, 3000, and 1024 bytes respectively. Since the described embodiment is primarily intended for teaching of lower guide level reading there is little space reserved for definitions. For foreign language instructions, reserved definition space needs to be much larger. A 14K bytes portion called working RAM, 28, for tables and other operations follows:

Next, the Source ROM memory 29 space starts at 32K and extends to 49K bytes at which point the Dictionary ROM 21 space commences. The first part of the Source ROM memory space is reserved for Dictionary data pointers, punctuation, and control bytes as explained below. In the case where words are to be introduced by the Source ROM that are not contained in the Dictionary ROM 21 or 21' a portion 29' of the Source ROM memory space is used as a non-standard dictionary.

The dictionary ROM space occupies the last 16K address bytes in a typical 8 bit microprocessor system. As explained below in conjunction with FIGS. 2B and 2C, if more dictionary space is required the effective address space can be increased by the Extended Dictionary ROM space 21' of FIG. 2A.

Figure 2B:
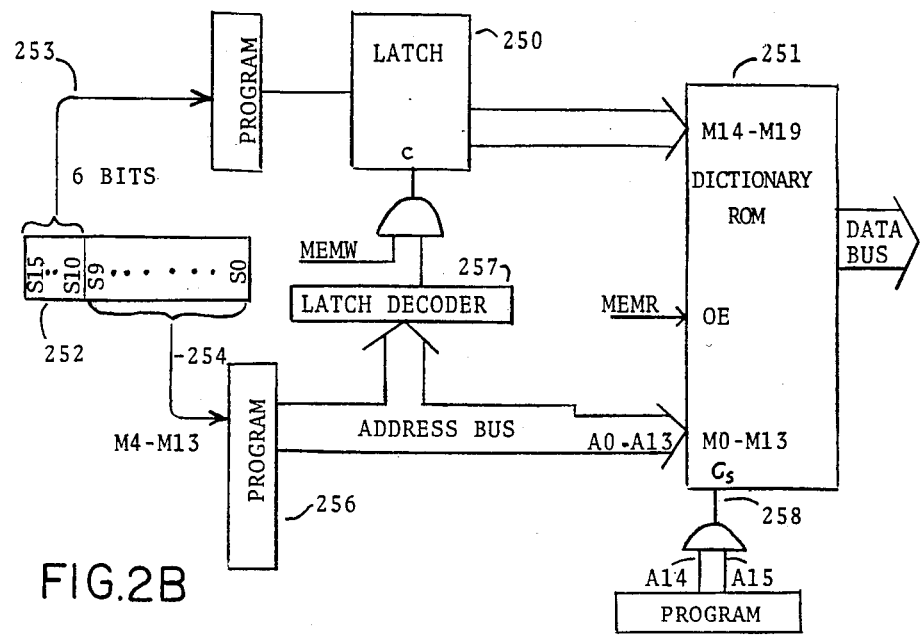
FIG. 2B is functional diagram depicting one technique to expand addressable memory using a 16 byte boundary.
Figure 2C:
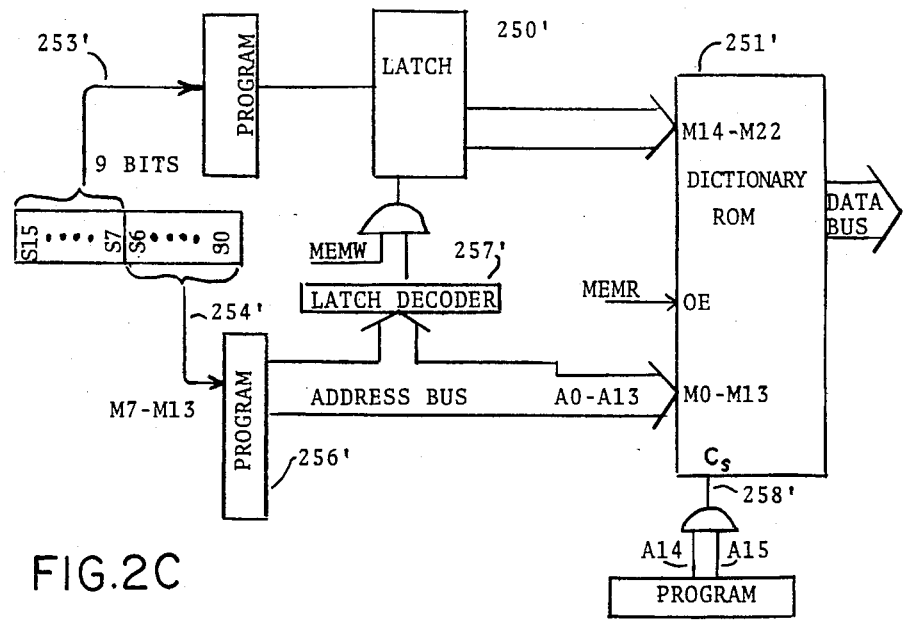
FIG. 2C is a functional diagram depicting another technique to expand addressable memory using a 128 byte boundry.

The dictionary memory can be extended beyond the 65K boundary normally determined by the 16 bit address bus using the technique depicted in conjunction with FIGS. 2B and 2C. With reference to FIG. 2B, element 252 depicts a 2 byte word in the Source ROM 4 of FIG. 1. Recall that data in Source ROM 4 is to point to the start address of the data for the word it represents in Dictionary ROM. However, note that the lowest portion of the data word, 254, is depicted as controlling lines 4 through 13 of the address bus instead of A0–A9. Since the words in Dictionary ROM are arranged so that their data always starts on a 16 byte boundary as measured from the start of the Dictionary ROM, i.e. E000H, E010H, E020H, etc., (hexidecimal notation) hence it is unnecessary to provide the lowest four bits in Source ROM data to define the start address of a word in Dictionary ROM since these first 4 bits are always zeros. Therefore it is possible to shift the pointer data in Source ROM to the right by 4 bits and make use of the most significant bits to control a latch which supplied the higher address bus lines. Hence, we provide, in total, 4 additional address lines to the Dictionary ROM. The upper 6 bits of the Source ROM data 253, FIG. 2B, are shown schematically being latched by program control into latch 250 which provides 6 latched address lines to the Dictionary ROM 251. Latch 250 can be memory mapped using one of the unused addresses in keypad spaces 21' of FIG. 2A. The address is selected by Latch Address Decoder 257, combined with the MEMW signal (Memory write from the processor control bus) and fed to the clock input of latch 250.

Dictionary ROM select signal 258 is obtained by decoding the address lines A14 and A15. When A14 and A15 are both true the output of the decoder activates the chip select input. The Dictionary ROM output enable receives its input from the MEMR control bus signal. Whenever the Dictionary ROM is to be addressed, the program provides true signals on A14 and A15, and the appropriate signals on A0–A13. The lowest nine bits of the Source ROM data provide the address lines A4–A13 while the next six bits provide the address lines M14–M19. The A0–A3 address lines are all zeros for the start of each word and are provided from the program. This scheme will provide up to 1 megabytes maximum addressable Dictionary ROM memory and would be adequate for a phoneme based system. Ths scheme also has the advantage of permitting normal address bus use of A0–A15 lines since only Dictionary ROM address lines M14–M19 are under latch 250 control.

The technique of FIG. 2C is preferred for a synthesizer system employing a digital filter because greater amounts of data can be stored. Note, if the boundary is selected as 128 bytes, it is then possible to provide an additional seven address lines because in this case the lowest 7 bits are not provided by the Source data since they are known to be zero. The upper nine bits are used to extend the addressable memory space to 23 lines. The chip select is determined the same as earlier; namely it is supplied by set of A14 and A15 by the program. This scheme will support a maximum of 8M byte retrieval or approximately 13,000 words at 640 bytes per word.

It is understood that the ROM and RAM memories of FIG. 1 have address decoding circuits to permit proper address selection. For example, program ROM 3 could consist of a single ROM masked chip. The 13 lower address lines A0–A12 could be coupled directly to the corresponding address pins on the chip. Address lines A13–A15 could be coupled to the input of an OR gate with the gate output coupled to the CE (Chip enable) pin of the chip. This would enable the ROM chip only if A13–A15 were all zeros, making the memory active only when the address is in the range 0 through 8191. It is not necessary that a single memory chip be used as program ROM. Well known address decoding schemes can provide the chip enable signal as necessary.

The Source ROM 4 of FIG. 1 is preferably a single semiconductor dual in line package (DIP), containing data organization in 8K×8 format, although 64K×1 organization will also be easily accommodated. Source ROM 4 is connected to the address bus, the control bus and the data bus which enables direct addressing of the data in Source ROM 4 as 8 bit bytes for high speed data transfer on the system data bus.

The address decoder and latch 11 serves to interface the system data bus with the speech synthesizer 12, such as the VOTRAX SC-01 phoneme based speech synthesizer chip. The synthesizer typically accepts data serially or in bytes as interfaced via the output latch 11. It is understood that in the case of serial data transfer, latch 11 serves as a shift register to provide the proper sequence of bits to the speech synthesizer 12.

A key pad 5 is shown containing 12 or more keys. Four arrow keys are to enable the user to control the position of a cursor on the visual display 9. The key "S" permits the user to command the system to cause the synthesizer to iniciate audible sounds for the word designated by the cursor on the display. If the key "S" is continued to be depressed the designated word will be repeatedly sounded until the key is released. The key "D" will enable the user to select the definition mode and will display the definition of the word designated by the cursor on the display. Depressing the "C" key will clear the definition from the display and return the full page of text to the display. The "+" key will command the system to load the next page from the Source ROM, and then to return to the portion of the execution program to cause the compilation of new concatenated data for the new page and then return to the cursor mode. The "−" key will decrement and cause the next previous page to load. The "J" key will command the system to the Jump mode which permits a jump to any page keyed in by the operator. The operator will use the "10" and "1" key to additively enter any number from 1–99 which will appear on the display as these keys are being pressed. Depressing the "+" or "−" key will then cause the indicated page to be loaded from Source ROM 4 to the Address Page Buffer 23. Alternatively, ten keys 0–9 could be provided in the key pad for direct page number selection.

The Character generator and Buffer 7 function in the same manner as described in our parent application. Specifically, the ASCII text data is loaded into video RAM 6 for each character of text to be displayed. The buffer and character generator 7 synchronize the timing and generate the dots in the proper position of the scan of the electron beam of video display to create visual images of the text characters. If plasma or liquid crystal display is employed, a different form of addressing and writing to the display is required. The RF modulator 8 receives the pulse sequence for the dots from the character generator 7 which then creates the RF carrier modulated by the dot sequence permitting a standard TV set 9 to be used as a display. Alternatively, modulator 8 and TV set 9 can be replaced by a standard video display monitor.

The program ROM 3 and working RAM 3' depict the memory for containing the execution program for the microprocessor and to enable table manipulation and other tasks to carry out the program objectives. While this description is with respect to a phoneme synthesizer and the use of an 8 bit microprocessor, a 16 bit processor may be desirable for use with multistage digital filter synthesizers to accomodate the much larger memory requirements and higher speeds.

Figure 3A:
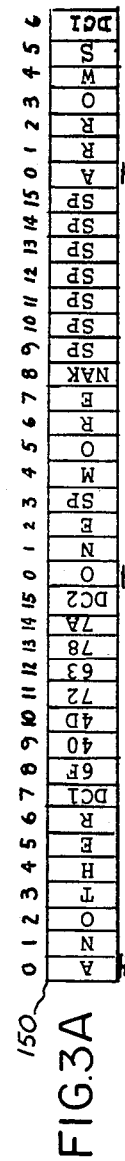
FIG. 3A–FIG. 3D depict the format of the data in Dictionary memory.
Figure 3B:
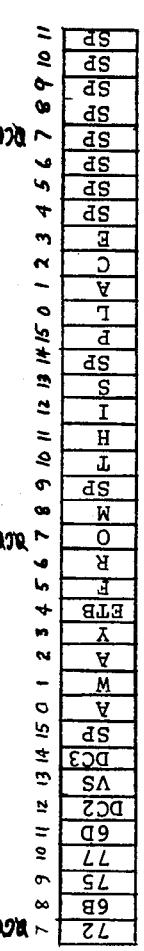
Figure 3C:
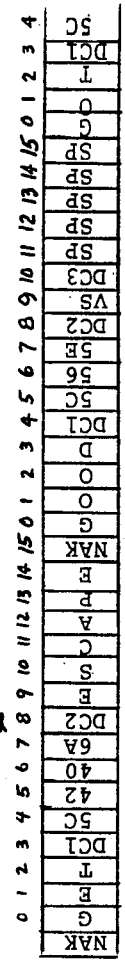
Figure 3D:
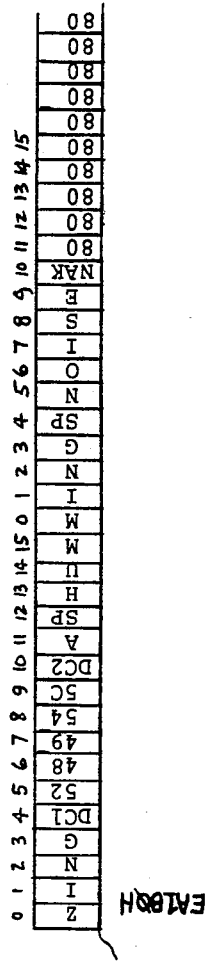
Figure 4:
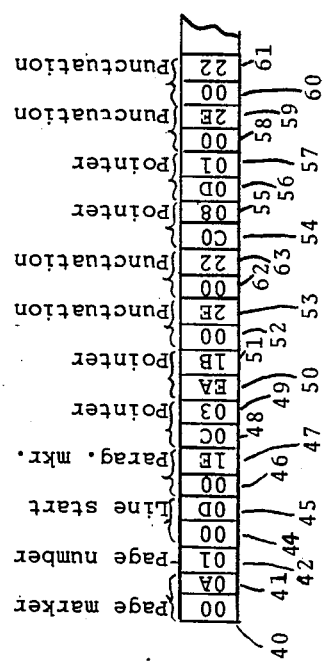
FIG. 4 depicts the format of data in Source ROM.

With reference to FIG. 4, the preferred format of the data in the Source ROM 4 is illustrated. The first byte 40 is 00 and indicates that the next byte is a control or character byte in ASCII notation. Byte 41 is hexidecimal 0AH which is ASCII "LF". The ASCII LF is used as a control symbol to indicate to the microprocessor the start of a new page. The next byte, 42, is reserved for the page number 00-FFH, hexidecimal, of the data to follow. Next appears bytes 44 and 45 which are 00 and 0D respectively which designates ASCII control character "CR" and which can note the line start in this design. 00 and 1EH are next, elements 46 and 47, which indicates tht the line to follow is a new paragraph and is to be indented in the text. Now, the address of the pointer to start of the first word referenced to the Dictionary memory appears. Bytes 48 and 49 are hexidecimal 0C03H which for illustrative purpose is representative of the start of the word data in FIG. 3A, element 150, of the Dictionary memory. Note the word "another" starts at 0C030H memory location in Dictionary memory. The next bytes EA1BH, 50 and 51, indicates the start address EA1B0H for the word "zing", FIG. 3D element 151. Next, appears the punctuation, specifically the 00 control byte then 2EH, the ASC11 byte standing for the ".". Completing the small portion of the Source ROM illustrated in FIG. 4 are the control 00 and 22H, for quotation marks, followed by C008H, elements 54 and 55, which represent the start addresses for "get". Next is 0D01H standing for the start of the Dictionary data for the "away". The final illustrated bytes are control 00 and 22H, elements 60 and 61 for the final quotation marks.

The execution program causes a selected page to be loaded into the Address Page Buffer 23, FIG. 2A, as depicted in FIG. 6 block 204. With reference to FIG. 6, the execution program then causes the creation of the data for the selected page, block 205, in a concatenated format essentially the same as the format described in our copending parent application in respect to FIGS. 6A–6B of that application. However in our earlier case, this complete page data in concatenated form was preassemblied and contained in the external source data memory and was loaded into the system in concatenated format. In this invention the concatenation is accomplished in resident memory under control of the execution program. A portion of memory is reserved for this data and is called "Concatenated Page Buffer" FIG. 2, element 24. The portion of the execution program to create the concatenated data responds to the internal control bytes and the address indicator data contained in the Source ROM.

With reference to FIG. 6, at 206, the concatenated data is now examined and a table is created to cross reference each word with a line and word number for each word in the text to be displayed. Also, the concatenated data for that page is then divided into seperate areas of working memories called text RAM 25, speech RAM 26 and definitions RAM 27. The start address of the speech and definition data for eachword on each line in text is cross referenced in a table in working memory 28 so that it is immediately retrievable by reference to the line and word number designated. Alternatively, if the processor is extremely fast, a direct search through the dictionary for a word corresponding to the spelling of the designated word could also be employed. However, this technique would make it difficult to customize the definition to a particular use of a word in the context of the text material.

Figures 5A, 5B, 5C:
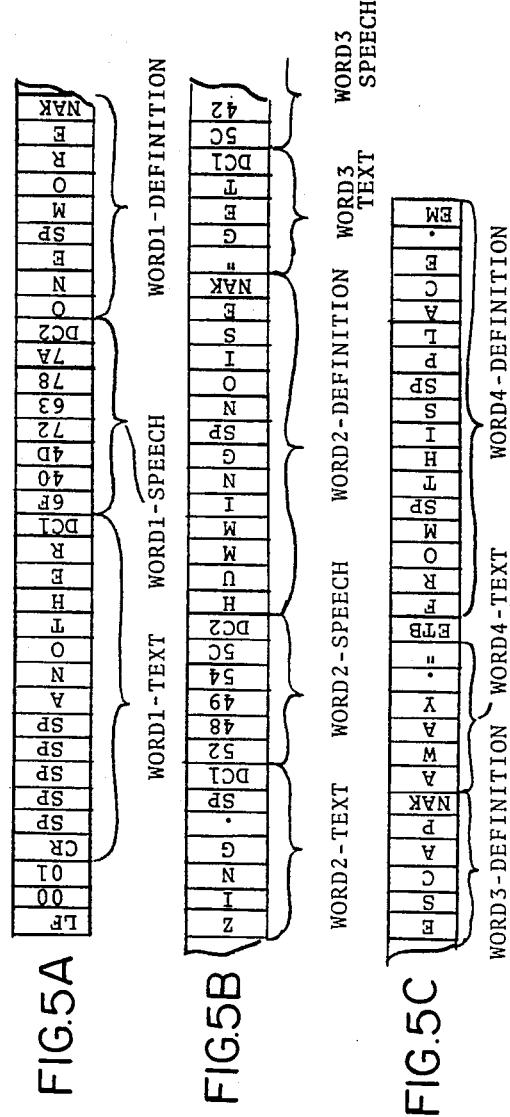
FIG. 5A–FIG. 5C depict format of data as stored in the Concatenated Page Buffer.
Figure 7:
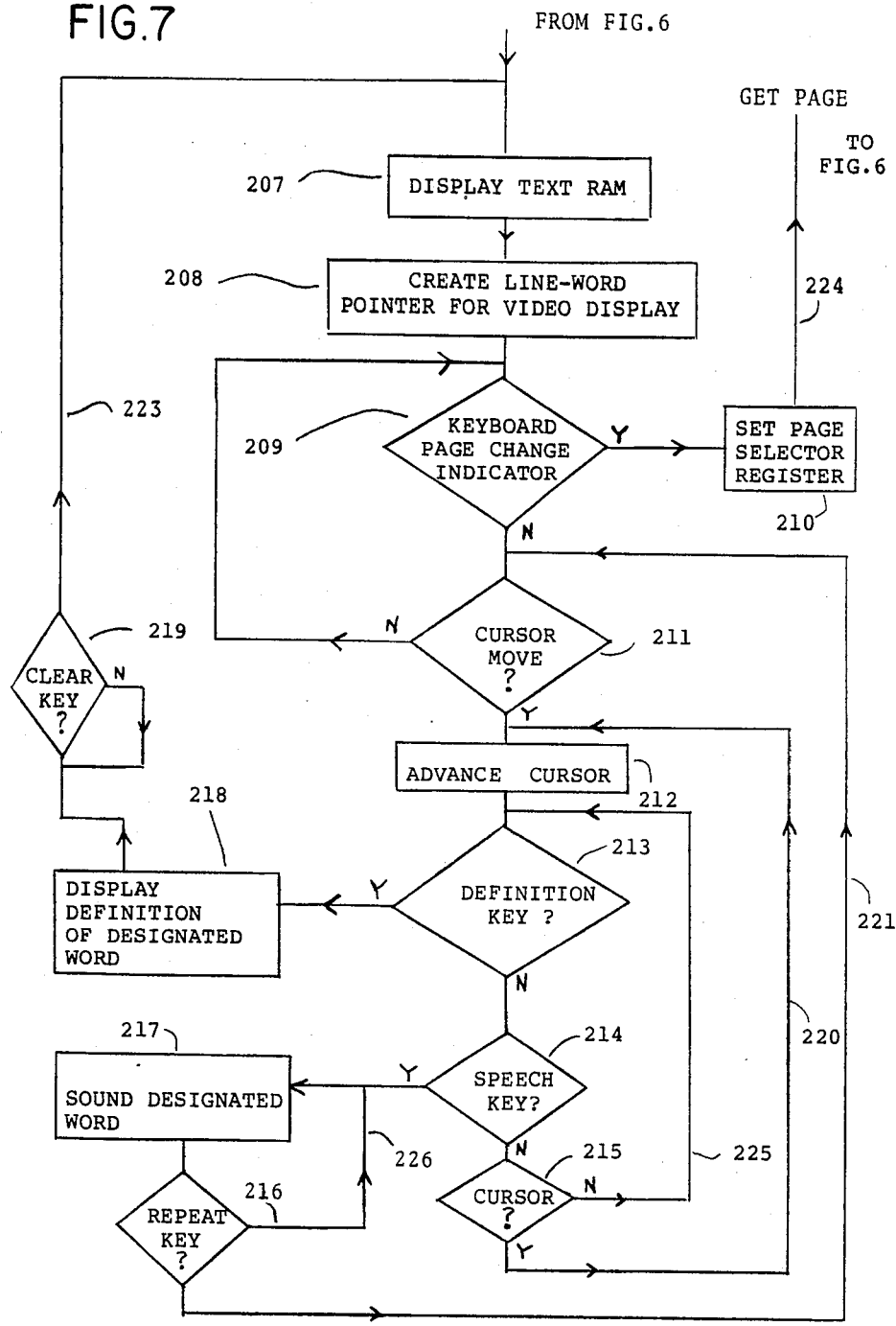

Next, with reference to the flow diagram of FIG. 7, the data from the text memory 25, FIG. 2A, is loaded to the video RAM memory 22 and hence displayed on the viewer, as depicted by block 207, FIG. 7. The program now analyzes the text memory data to determine a line and word number for each word in the text memory. One such technique is to interleave between each byte of each word in the text memory a byte which is coded to represent the line and word number on that line. As an example, assume that the text memory derived from the concatenation data of FIGS. 5A–5C contains the word "zing" as the second word on line one. In the text memory, code bytes indicative of the line and word number are interleaved so that they appear as follows: /x/01/I/01/N/01/G/01/./0.1/. The byte inserted between each ASCII character in text memory can be a hexidecimal byte from 00H-FFH. The left most portion of the byte represents the line number and the right side represents the word number, i.e. 00H is line 1, word 1 and FFH represents line 16, word 16. In the example above 01H is line 1, word 2.

FIG. 7, block 209, depicts a keypad scan portion of the program. The keypad is continually scanned for a depression of a page change key, such as "+", "−" or "J" or one of the cursor move arrow keys.

If one of the page change keys is depressed, the page selector register is reset, FIG. 7 at block 210, and the execution program causes the processor to jump back to the portion of the program to search the Source ROM for the selected page, at block 201 of FIG. 6. This would then cause a new page to be loaded from the Source ROM to the Address Page Buffer. If a page change key is not depressed and a cursor arrow key is depressed, a cursor such as an underlining character, a special character, inverse highlight character or blinking character is displayed as a moveable designator which is under the control of the keyboard arrows. So long as an arrow key remains depressed the cursor moves in the direction of the key command, as depicted in FIG. 7 by the branch 220. Therefore, the cursor can be moved to align with any word on the screen to be designated for speech or definition. When an arrow key is no longer depressed, the "S" and "D" keys via branch 225 are examined and if key "S" or "D" are depressed the speech mode or the definition mode is entered. A light pen designator or joy stick cursor controller could also be employed to designate a selected word as described in our present application referred to earlier.

In both speech or definition modes, to determine the line and word number of the designated word, the address of the cursor in the video display is offset indexed to the text memory to he corresponding character in the text RAM. Since the text memory has the code word interleaved between text bytes which represents line and word number of the word, the code byte stored in the next memory location is retrieved. If an operator requested the sounding of designated word, the line and word code is determined and then used to search in the cross reference table of starting addresses for the speech RAM data. Next the data starting at that indicated address in the speech RAM is feed to the synthesizer 12 of FIG. 1. If the "S" key remains depressed, as depicted by branch 226 of FIG. 7 the word will be repeatedly sounded until the key is released. After release of the key, the program will jump back to the cursor mode for the designation of any other word on the screen.

In a like manner, depression of the "D" key will initiate display of the definition of the selected word on the screen as depicted at block 218 of FIG. 7, if the definition is encoded. If the definition is not encoded, a code byte is coded which causes the display to indicate that to the user that the selected word is not defined by this program material. To display definitions, all or a portion of the screen is cleared and the definition is displayed. After the user is finished reading the definition or translation, the user can depress the "C" key to clear the screen and redisplay the page of text by the jump back to block 207 as depicted at branch 223.

The above description was in reference to data in the Source memory 4, FIG. 1, having the format of FIG. 4. All words are indicated by a two byte address in the Dictionary memory. Since this is restrictive on the words which can be used in the textual material, provision can be made to enable flexibility in this respect by enabling the appendage to the standard Dictionary of a section called the non-standard Dictionary. Non-standard DIctionary data would also be derived from the Source ROM 4 and could be located at the top end of Source ROM memory as indicated by 29' in memory map FIG. 2A. The addresses of the non-standard dictionary words need only be known at the time of the Source ROM, making it practical to develop additional Source material after release of the Dictionary ROM. For systems which use direct search through the Dictionary as described above, and indication must be provided in the Source ROM of the start of the non-standard dictionary.

A somewhat more compact form of Source ROM code could be used than the format described above in conjunction with FIG. 4. Rather than use the 00 byte marker for control characters, punctuation and single characters, as described, these symbols could be encoded without the 00 byte if the most significant bit of the first byte of all two byte pointers were always set to 1. Since all ASCII control characters, punctuation and alphanumerics have a zero in the most significant bit, the pointer data would always be distinct. This format would reduce the amount of Source ROM memory required for a given amount of text material but also limits the Dictionary to a maximum of 32K words. In this case, the Dictionary ROM of FIGS. 2B and 2C would have a maximum number of address lines of 19 and 22 respectively, which is one less than shown.

The execution program depicted in FIG. 6 and FIG. 7 initiates a search through the Source ROM, as shown at block 201, 202 and 203 for the page to match the page number in the Page Selection Register. The Page Selection Register is a pair of reserved bytes located in high working memory which are caused to store the default page number or the page number selected by the user as illustrated in FIG. 7 at 209.

The embodiments of the invention, being primarily intended for the teaching of reading, have been described in conjunction with the retrieval of a single word. However, it is envisioned that there are certain learning disabilities which would be most effectively treated by returning an output display of more than a single word upon selection of part of a line or paragraph by an operator.

We claim the following:

1. A new method of using digital electronic apparatus to aid students in learning comprising:
    storing in a concatenated string in a first memory first binary data pointers representative of a contiguous passage of text, said first binary data pointers including indication of the start addresses for the text words stored in a second memory;
    storing in said second memory second binary data being representative of a preselected listing of human language words, said second binary data including data representative of at least two different forms of said human language words;
    in operation, displaying a selected portion of said contiguous passage of text responsive to a student operator's portion selection commands, said display being a graphic human language representation of said selected portion;
    responsive to student operator instructions, designating one word of said contiguous portion of text being graphically displayed; and
    selectively providing responsive to student operator commands either a synthesized audible output of said designated word or an explanatory graphic representation of said designated word substantially immediately responsive to said student command, said audible output being representative of the spoken form of said designated word and said explanatory graphic representation being textual commentary about said designated one word.

2. The method of claim 1 wherein the synthesized audible output representative of the spoken form of said designated word is in a human language different from the language of said text.

3. The new method of claim 1 wherein said explanatory graphic representation of said one word comprises displaying in legible form the definition of said designated one word.

4. A new method of using digital electronic apparatus to aid students in learning comprising:
    storing in a first memory first binary data pointers representative of a list of human language words, said first binary data pointers indicating the start addresses for each word stored in a second memory;
    storing in a second memory second binary data representative of at least two different forms of representation relating to said human language words;
    in operation, selecting and graphically displaying a portion of words from said list of words responsive to a student operator's instructions;
    in operation, enabling designation of a word from said portion of selected and displayed words in response to commands from a student operator;
    in operation, further enabling selection of one of said different forms of output display of a designated word by the operator; and
    substantially immediately after selection of the form of said output display, providing said output display of said designated word in said selected one form.

5. In a new method of using a microprocessor system as a teaching aid for learning course material wherein the system contains a microprocessor controlled by an executory program, a speech synthesizer, internal memory, external memory, external memory having a portion coded to represent a text to be displayed, means to access said external memory and means to output data to an electronic graphic display, the improvement comprising
    coding a portion of said internal memory to represent a standard dictionary, said standard dictionary being a preselected list of words including code indicative of the visual form of said words and code for controlling the creation of the spoken form of said words, said code further providing means to indicate the presence or absence of coding representative of explanatory comments relating to said words;
    said coding of said portion of external memory representative of said test to be displayed comprising concatenating a code, said concatenated code including pointers indicative of the starting address in memory for text words in said course material;
    coding a further portion of said external memory to represent words in said course material which are not represented in said standard dictionary but which appear in said course material, said further portion of said external memory being a non-standard dictionary which includes code indicative of the visual form of said words, code for controlling the audible form of said words and code to indicate the presence or absence of explanatory material relating to each said word in said non-standard dictionary;
    controlling said system by said executory program to be responsive to operator commands to decode said text coding and to output data to said display for operator selected page of text whereby said executory program causes the fetching of concatenated coded course material from said external memory, interpreting said coded course material, fetching words from the appropriate dictionary according to said concatenated coded course material and sending character codes to said display to create the selected page of text responsive to the said text coding; and further controlling said system by said executory program to be responsive to the designation and selection by the operator of any one word appearing on the display to selectively provide one of two outputs corresponding to said designated word substantially immediately following designation and selection, the first of said outputs being audible synthesized speech corresponding to said designated word and the second of said outputs being a visual display of the explanatory comments corresponding to said designated word.

* * * * *